United States Patent [19]
Ferguson

[11] Patent Number: 6,043,569
[45] Date of Patent: Mar. 28, 2000

[54] ZERO PHASE SEQUENCE CURRENT FILTER APPARATUS AND METHOD FOR CONNECTION TO THE LOAD END OF SIX OR FOUR-WIRE BRANCH CIRCUITS

[76] Inventor: Gregory N. C. Ferguson, 2337 Stag Run Blvd., Clearwater, Fla. 33765

[21] Appl. No.: 09/033,191

[22] Filed: Mar. 2, 1998

[51] Int. Cl.[7] .................................................... H02J 1/02
[52] U.S. Cl. ........................ 307/105; 333/176; 333/177
[58] Field of Search .............................. 307/105; 333/12, 333/167, 175–177; 363/39, 215; 327/551

[56] References Cited

U.S. PATENT DOCUMENTS

| | | | |
|---|---|---|---|
| 5,323,304 | 6/1994 | Woodworth | 363/39 |
| 5,406,437 | 4/1995 | Levin | 363/39 |
| 5,416,688 | 5/1995 | Levin | 363/39 |
| 5,576,942 | 11/1996 | Beverly et al. | 363/39 |

Primary Examiner—Richard T. Elms
Attorney, Agent, or Firm—Stein, Schifino & Van Der Wall

[57] ABSTRACT

An apparatus and method for substantially reducing zero sequence harmonic currents at the load-end of branch circuits that supply single-phase, non-linear loads. The invention includes a three-phase, six-terminal, zig-zag autotransformer which functions as the zero sequence filter. The first winding, which is located on the first core leg, is connected in series with the sixth winding, which is located on the third core leg. The third winding, which is located on the second core leg, is connected in series with the second winding, which is located on the first core leg. The fifth winding, which is located on the third core leg, is connected in series with the forth winding, which is located on the second core leg. In this configuration, the first winding is magnetically coupled to the second winding, the third winding is magnetically coupled to the forth winding and the fifth winding is magnetically coupled to the sixth winding.

20 Claims, 3 Drawing Sheets

ZERO PHASE SEQUENCE CURRENT FILTER APPARATUS AND METHOD FOR CONNECTION TO THE LOAD END OF SIX OR FOUR-WIRE BRANCH CIRCUITS

BACKGROUND OF THE INVENTION

1. Field of the Invention

This invention relates to electrical distribution systems. More particularly, this invention relates to a zero phase sequence harmonic current filter apparatus and method for connection to the load-end of a six-wire or four-wire branch circuit.

2. Description of the Background Art

High levels of positive, negative and third order, zero [phase] sequence harmonic currents are generated by the single-phase, non-linear loads that are connected between phase and neutral in a three-phase, four-wire distribution system. Although each single-phase, non-linear load is normally small, they often represent 95% to 100% of all loads connected to a low voltage distribution system in an office, data center or audio-video facility.

Unlike the positive and negative sequence phase currents, which are each displaced by 120° in a three-phase system, zero sequence phase currents are each displaced by 0° and are therefore "in-phase". As a result, zero sequence phase currents combine arithmetically at the source transformer's neutral terminal ($X_0$) and return to the nonlinear loads via the system's neutral conductor. In a worst case scenario, the resulting zero sequence neutral currents may be greater than 1.5 times the phase currents.

Zero sequence phase currents, acting in an Ohm's Law relationship with the system's zero sequence impedances, produce zero sequence voltages. These zero sequence voltages distort the fundamental voltage waveforms.

The most significant source of third-order, zero sequence currents is the switch-mode power supply. These power supplies are found in personal computers, mainframe terminals, monitors, LAN controllers-servers, printers, photocopiers, facsimile machines, electronic ballasts, television sets, audio-video amplifiers and recorders.

Significant levels of third-order, zero sequence currents and voltages in the electrical distribution system will have a severe impact on both the system and the devices connected to it. Depending on the capacity and configuration of the system, the presence of third-order, zero sequence currents may include any or all of the following symptoms:

a) High peak phase currents,
b) High average phase current,
c) High total harmonic distortion of current,
d) High total harmonic distortion of voltage,
e) High system losses,
f) Apparatus overheating,
g) High neutral current,
h ) High common mode noise,
i) Low power factor, and
j) High cost of power.

In addition to the higher operating and maintenance costs associated with poor power quality and common mode noise, overloaded system neutral conductors, branch circuit "shared neutral" conductors and office partition "shared neutral" conductors may pose a serious fire and safety hazard.

Various techniques have been used to mitigate these symptoms. These include the replacement of conventional and K-Factor rated distribution transformers with specialized transformers that have ultra-low zero sequence impedance, the application of zero sequence shunt filters at distribution panels and/or sub-panels, and the application of directional zero sequence series filters at the line side of distribution panels.

More particularly, with reference to FIG. 1, a conventional four-terminal zig-zag autotransformer, which is applied to a three-phase, four-wire electrical distribution panel or sub-panel as a zero sequence current filter, has six windings: 1, 2, 3, 4, 5 and 6 respectively. Normally, each of these windings has an equal number of turns. The six windings are installed on a three-phase magnetic core which has three core legs: a, b and c respectively.

Windings 1 and 2 are installed on core leg a, windings 3 and 4 are installed on core leg b, and windings 5 and 6 are installed on core leg c.

The three phases of the electrical power distribution system are connected to filter terminals 10, 30 and 50, and the neutral conductor of the electrical power distribution system is connected to filter terminal 70.

Filter terminal 10 is connected to winding 1 at junction 11. Connecting junctions 12 and 62 connects winding 1 to winding 6. Winding 6 is connected to terminal 70 at junction 61.

Filter terminal 30 is connected to winding 3 at junction 31. Connecting junctions 32 and 22 connects winding 3 to winding 2. Winding 2 is connected to terminal 70 at junction 21.

Filter terminal 50 is connected to winding 5 at junction 51. Connecting junctions 52 and 42 connects winding 5 to winding 4. Winding 4 is connected to terminal 70 at junction 41.

Connected in this fashion and under balanced zero sequence current conditions, the zero sequence currents, which flow through each pair of windings on the common core leg, will be equal but of opposite polarity. The flux produced by each of these windings will also be equal and have opposite polarity. As a result of flux cancellation, the zero sequence impedance of the filter will be reduced to the resistance of the filter's winding conductors.

The zero sequence impedance of an ideal filter will normally be at least ten times lower than that of the power source. By connecting the filter in parallel with the power source and the single-phase, non-linear loads, the load-generated zero sequence currents will be attracted by the lower impedance of the filter. This will result in a reduction of the zero sequence currents in the three-phase, four-wire system between the filter connection and the power source.

Known prior art zero phase sequence harmonic current filters are disclosed in U.S. Pat. Nos. 5,406,437, 5,416,688, and 5,576,942 and in *Power Quality*, Sept./Oct. 1991, pp. 33–37, "Eliminating Harmonic Currents Using Transformers." by Robert H. Lee of R. H. Lee Engineering. Further, zero phase sequence harmonic current filters have been discussed in technical papers presented at the IEEE IAS Annual Meeting, Orlando, Fla., held October 1995, by Thomas Key and Jih-Sheng Lai entitled "Costs and Benefits of Harmonic Current Reduction for Switch-Mode Power Supplies in a Commercial Office Building." and at the NETA Annual Conference, Mar. 19, 1997, Gregory N. C. Ferguson, Power Quality International, Inc. entitled "Power Quality Improvement in a Harmonic Environment." The disclosures of the above-referenced patents, publications and technical papers are hereby incorporated by reference herein.

As set forth in the forgoing disclosures, although these prior art devices can be effective in mitigating these symptoms, at their point of application or between their point of application and the upstream source transformer, they cannot relieve these symptoms in the downstream branch circuits or at the branch circuit loads, particularly where the branch circuits are long. Indeed, with regard to all patented and/or commercially available zero [phase] sequence current filters known to Applicant, they are configured as three-phase, four-wire devices and are therefore entirely unsuitable for application at the load-end of a branch circuit which includes three pairs of phase and neutral conductors (six-wire). Therefore, there has been a long-felt need for adapting prior art zero phase sequence harmonic current filters to the load-end of a branch circuit which includes three pairs of phase and neutral conductors (six-wire).

Therefore, it is an object of this invention to provide an improvement which overcomes the aforementioned inadequacies of the prior art devices and provides an improvement which is a significant contribution to the advancement of the zero sequence harmonic filter art.

Another object of this invention is to provide zero phase sequence harmonic current filter apparatus and method for connection to the load-end of a six-wire or four-wire branch circuit.

Another object of this invention is to provide a zero phase sequence harmonic current filter apparatus and method that significantly reduces peak phase currents, average phase currents, total harmonic distortion of current, total harmonic distortion of voltage, system losses, apparatus overheating, neutral current, common mode noise, low power factor, and cost of power at the load-end of a branch circuit which includes three pairs of phase and neutral conductors (six-wire).

Another object of the invention is to provide an apparatus and method for reducing the non-linear load-generated zero sequence harmonic currents and voltages on three single-phase circuits, which are combined to form a six-wire branch circuit, and their three-phase, four-wire distribution system source, said apparatus and method comprising a three-phase zig-zag autotransformer, having three pairs of phase and neutral terminals and means for respectively connecting the phase and neutral terminals of the zig-zag autotransformer in parallel with the six-wire branch circuit at the load-end thereof.

Another object of this invention is to provide an apparatus and method for reducing the non-linear load-generated zero sequence harmonic currents and voltages on three single-phase circuits, which are combined to form a four-wire, "shared neutral" branch circuit, and their three-phase, four-wire distribution system source, said apparatus and method comprising a three-phase zig-zag autotransformer, having three pairs of phase and neutral terminals; means for connecting the three neutral terminals to the shared neutral of the branch circuit; and means for respectively connecting the phase terminals of the zig-zag autotransformer in parallel with the three phases of the branch circuit at the load-end thereof.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention and the detailed description of the preferred embodiment in addition to the scope of the invention defined by the claims taken in conjunction with the accompanying drawings.

SUMMARY OF THE INVENTION

For the purpose of summarizing the invention, the invention comprises an apparatus and method for substantially reducing zero [phase] sequence harmonic currents at the load-end of branch circuits that supply single-phase, non-linear loads. The branch circuits may include either three pairs of phase and neutral conductors (six-wire) or three phase conductors and a common "shared neutral" conductor (four-wire). In either of these branch circuit configurations, each of the three phase conductors must be supplied from a different phase of the same three-phase, four-wire power source. Likewise, the three neutral conductors or the "shared neutral" conductor must also be supplied from that same power source.

The invention includes a three-phase, six-terminal, zig-zag autotransformer which functions as the zero sequence filter. The six windings normally have an identical number of turns and are installed on a three-phase, three-legged magnetic core.

The first winding, which is located on the first [outside] core leg, is connected in series with the sixth winding, which is located on the third [outside] core leg.

The third winding, which is located on the second [center] core leg, is connected in series with the second winding, which is located on the first core leg.

The fifth winding, which is located on the third core leg, is connected in series with the forth winding, which is located on the second core leg.

With respect to polarity, these series connections are all made at the same end of each winding. Conversely, connections to the three-phase, six or four-wire branch circuit are made from the other end of each winding.

In this configuration, the first winding is magnetically coupled to the second winding, the third winding is magnetically coupled to the forth winding and the fifth winding is magnetically coupled to the sixth winding.

In order to substantially reduce the zero sequence currents on the three phases and neutral conductor(s) of a branch circuit, the present invention may be installed at an office partition's standard wireway polyphase receptacle, a 'home run' junction box or an electronic equipment rack.

Where the branch circuit contains three phase conductors and three neutral conductors, the three phase conductors of the circuit are connected to the three phase terminals of the filter and the three neutral conductors of the circuit are connected to the three neutral terminals of the filter. In this case, each pair of phase and neutral circuit conductors are connected to a pair of series connected filter windings. This arrangement allows the three-phase zero sequence filter to be connected to three single-phase circuits [which include all three phases of the three-phase, four-wire distribution system] without the need to parallel the three neutral conductors in the branch circuit.

Where the branch circuit contains three phase conductors and a common "shared neutral" conductor, the three phase conductors of the circuit are connected to the three phase terminals of the filter and the "shared neutral" conductor of the circuit is connected to a designated neutral terminal of the filter. In this configuration, the designated neutral terminal is connected in parallel with the remaining two neutral terminals.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference numerals refer to similar parts throughout the several views of the drawings.

DESCRIPTION OF THE PREFERRED EMBODIMENTS

Figure 1:
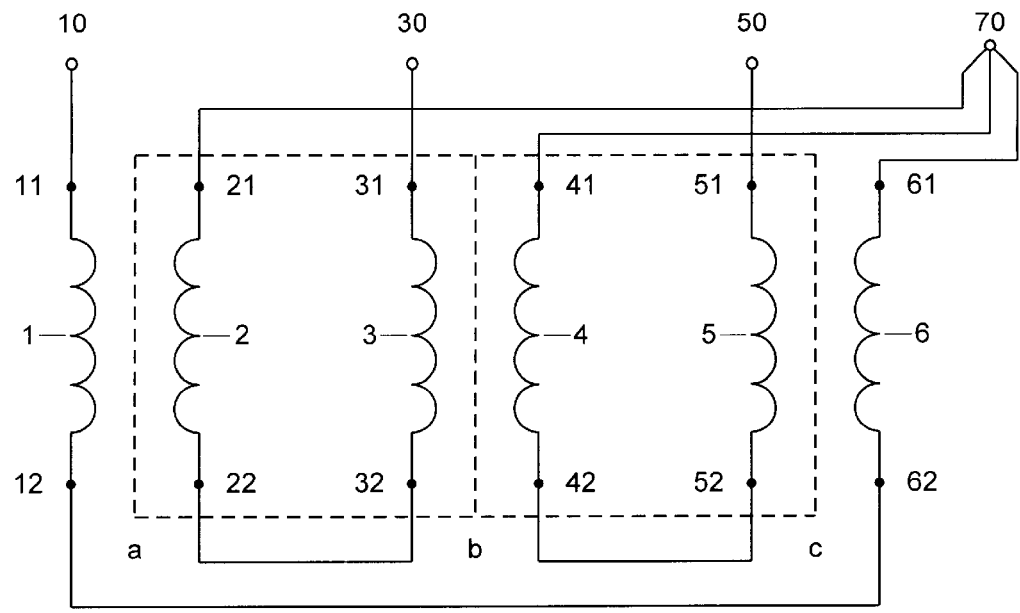
FIG. 1, described above, is a schematic view of a conventional four-terminal zig-zag autotransformer, which is used as a zero sequence filter, for application at a three-phase, four-wire electrical distribution panel or sub-panel.

As noted above in connection with FIG. 1, zero [phase] sequence current filters are configured as three-phase, four-wire devices and are therefore entirely unsuitable for application at the load-end of a branch circuit which includes three pairs of phase and neutral conductors (six-wire). Most importantly, in order to connect a four-wire filter to a six-wire branch circuit, it would be necessary to parallel the three neutral conductors of the branch circuit at the point of filter application. North American electrical codes will not allow small conductor sizes to be connected in parallel. The present invention solves this problem as follows.

Figure 2:
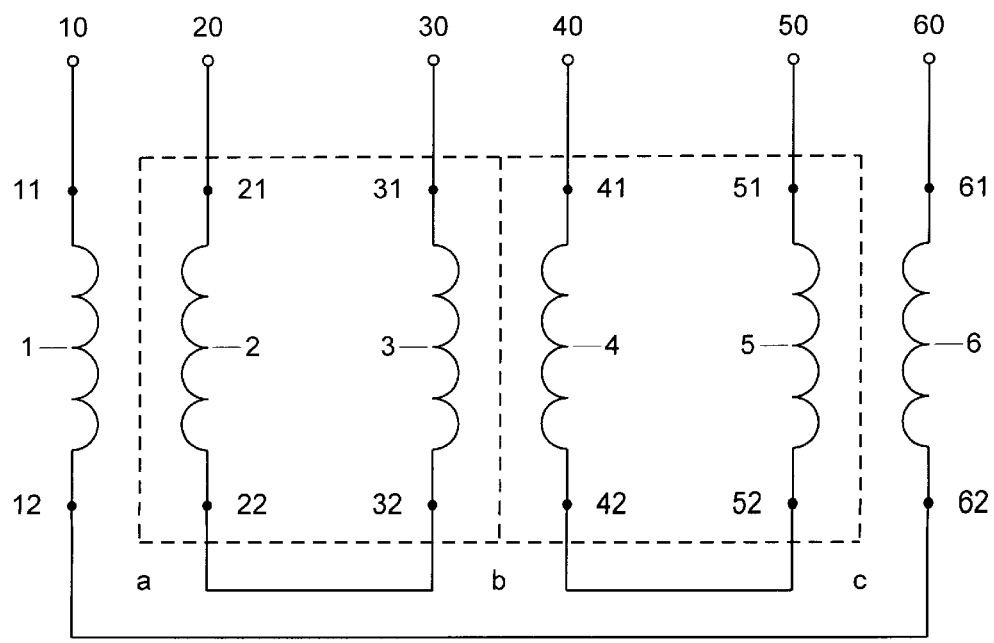
FIG. 2 is a schematic view of the six-terminal zig-zag autotransformer, embodying the invention, which is used as a zero sequence filter, for application at the load-end of a branch circuit.

With reference to FIG. 2, the preferred embodiment of the invention, a six-terminal zig-zag autotransformer, which may be applied to the load-end of a six-wire branch circuit (three pairs of phase and neutral conductors) as a zero sequence filter, has six windings: 1, 2, 3, 4, 5 and 6 respectively. Normally, each of these windings has an equal number of turns. The six windings are installed on a threephase core which has three core legs: a, b and c respectively. Windings 1 and 2 are installed on core leg a, windings 3 and 4 are installed on core leg b, and windings 5 and 6 are installed on core leg c.

The three phase conductors of the branch circuit are connected to filter terminals 10, 30 and 50, and the three accompanying neutral conductors are connected to filter terminals 20, 40 and 60 respectively. Since terminals 20, 40 and 60 are electrically isolated, the present invention does not cause the three branch circuit neutral conductors be connected in parallel.

Filter terminal 10 is connected to winding 1 at junction 11. Connecting junctions 12 and 62 connects winding 1 to winding 6. Winding 6 is connected to terminal 60 at junction 61.

Filter terminal 30 is connected to winding 3 at junction 31. Connecting junctions 32 and 22 connects winding 3 to winding 2. Winding 2 is connected to terminal 20 at junction 21.

Filter terminal 50 is connected to winding 5 at junction 51. Connecting junctions 52 and 42 connects winding 5 to winding 4. Winding 4 is connected to terminal 40 at junction 41.

Connected in this manner and under balanced zero sequence harmonic current conditions, the zero sequence currents, which flow through each pair of windings on the common core leg, will be equal but of opposite polarity. The flux produced by each of these windings will also be equal and have opposite polarity. As a result of flux cancellation, the zero sequence impedance of the filter will be reduced to the resistance of the filter's winding conductors.

With the filter connected at the load-end of the six-wire branch circuit, the zero sequence impedance of the present invention will typically be twenty times lower than that of the power source. By connected the filter in parallel with the power source and the single-phase, non-linear loads, the non-linear load-generated zero sequence harmonic currents will be attracted to the lower impedance of the filter. This will result in a reduction of the zero sequence harmonic currents in the six-wire branch circuit and the three-phase, four-wire distribution system.

Figure 3:
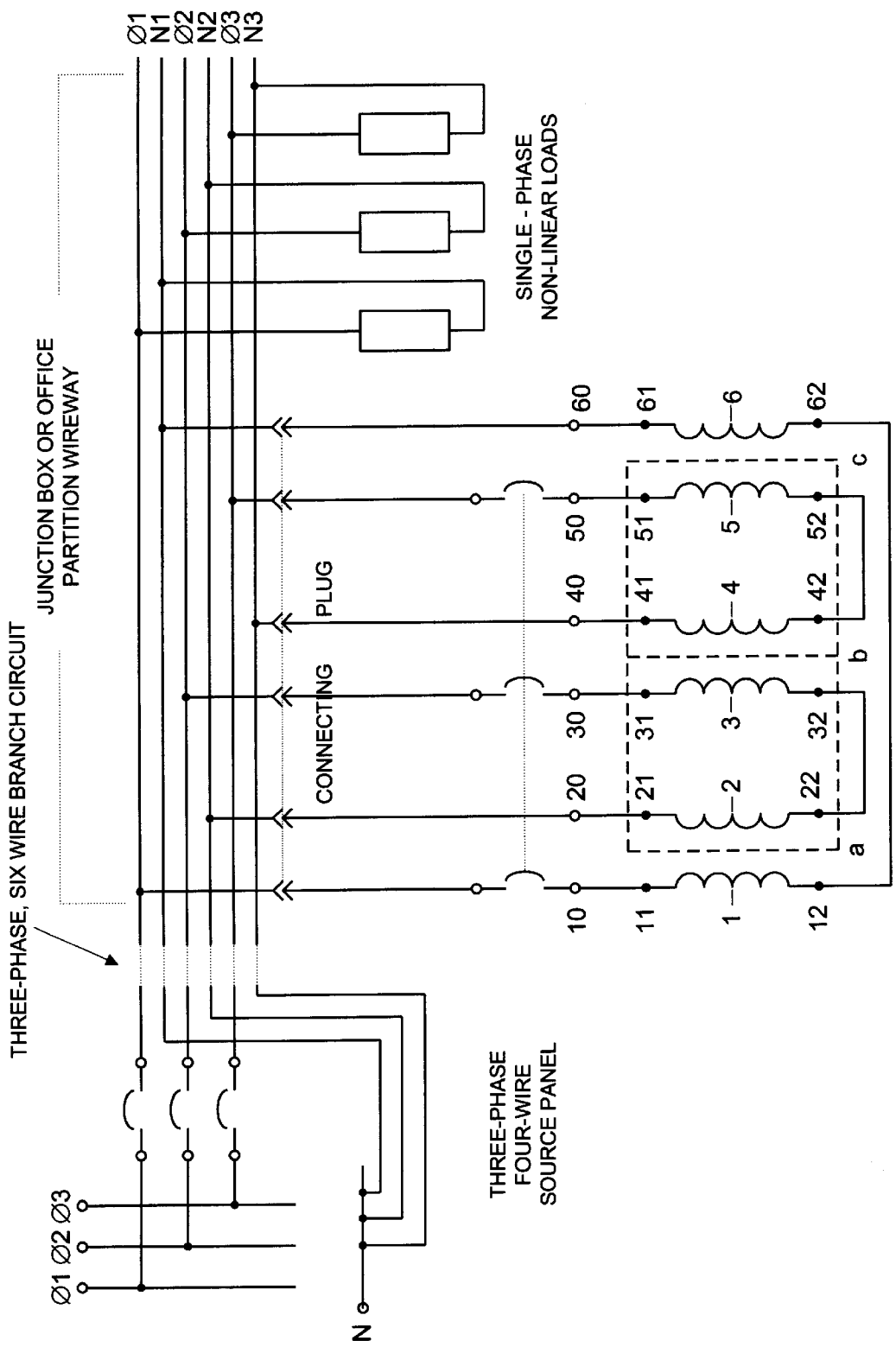
FIG. 3 is a schematic view of a preferred embodiment of the invention and its application to the load-end of a branch circuit which includes three pairs of phase and neutral conductors (six-wire)

By way of example, FIG. 3 illustrates the application of the preferred embodiment of the invention at the load-end of a six-wire branch circuit as described above (Ref. FIG. 2).

Figure 4:
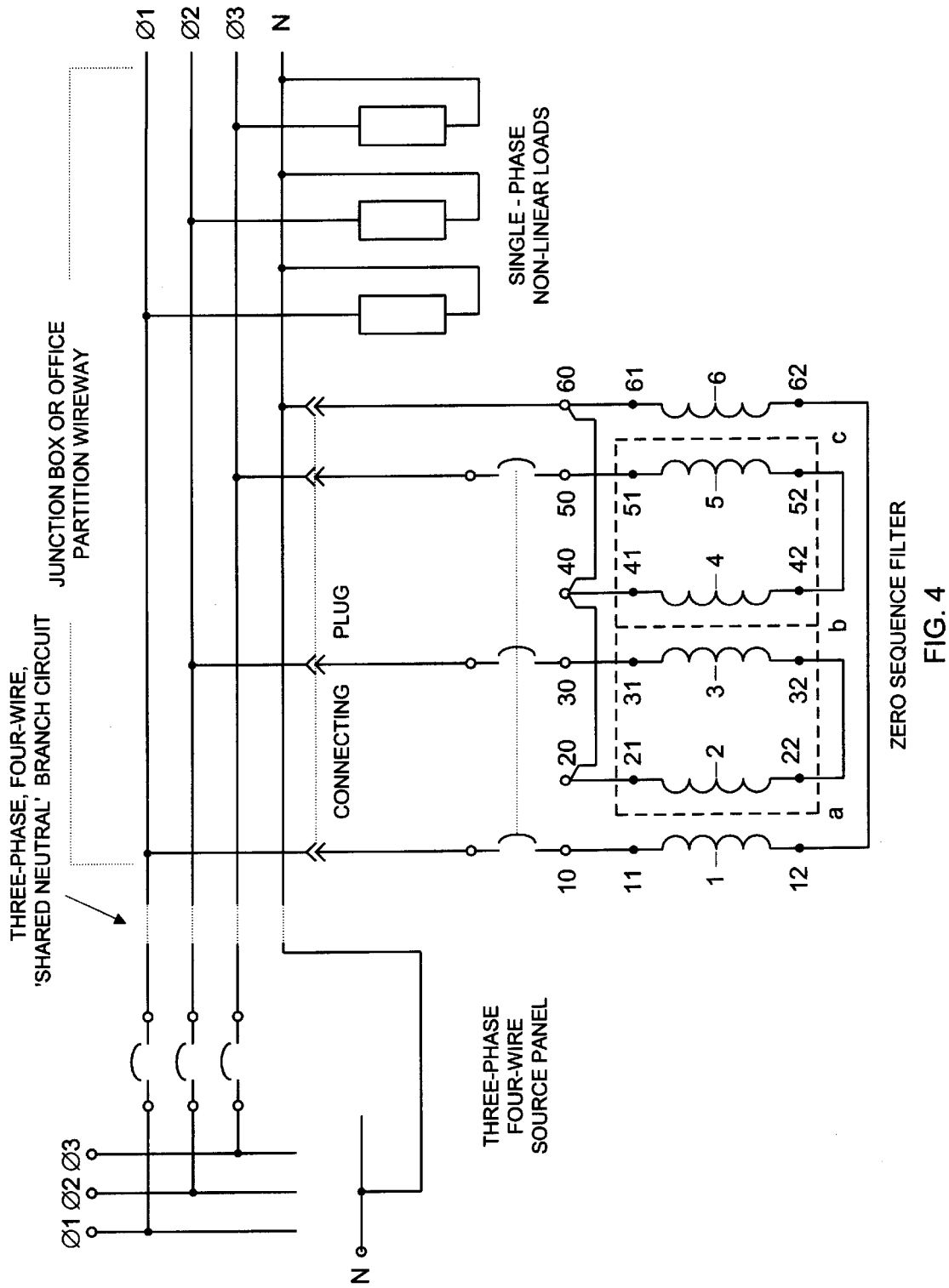
FIG. 4 is a schematic view of a preferred embodiment of the invention for application to the load-end of a branch circuit which includes three phase conductors and a common "shared neutral" conductor (four-wire).

By way of example, FIG. 4 illustrates the application of the preferred embodiment of the invention to a four-wire branch circuit which includes three phase conductors and a common "shared neutral' conductor. In this configuration, the three phase conductors of the branch circuit are connected to filter terminals 10, 30 and 50, the "shared neutral" conductor is connected to filter terminals 20 with terminals 20, 40 and 60 connected together.

Connected in this manner and under balanced zero sequence harmonic current conditions, the zero sequence currents, which flowing through each pair of windings on the common core leg, will be equal but of opposite polarity. The flux produced by each of these windings will also be equal and have opposite polarity. As a result of flux cancellation, the zero sequence impedance of the filter will be reduced to the resistance of the filter's winding conductors.

With the filter connected at the load-end of the four-wire branch circuit, the zero sequence impedance of the present invention will typically be twenty times lower than that of the power source. By connecting the filter in parallel with the power source and the single-phase, non-linear loads, the non-linear load-generated zero sequence harmonic currents will be attracted to the lower impedance of the filter. This will result in a reduction of the zero sequence harmonic currents in the four-wire branch circuit and the three-phase, four-wire distribution system.

As a zero sequence current filter, the preferred embodiment will also act upon the zero sequence component of any unbalanced positive or negative sequence frequency in a three-phase four or six-wire network. As a result, the filter is an effective phase-current balancer at any positive or negative frequency. By balancing the system's three phase currents, the filter will also tend to balance the system's three phase voltages.

As noted above, the filter of the invention is designed for connection to pre-wired office partitions or at the load end of any other two or three-phase branch circuits. For example, when connected to a pre-wired office partitions, the filter can be supplied with a suitable flexible multi-conductor power cable which is terminated with any partition manufacturer's wire-way receptacle connecting plug. When connected at the load end of a two-phase, three-wire "shared neutral" branch circuit or a three-phase four-wire "shared neutral" branch circuit, the filter can be supplied with a pre-wired flexible conduit for permanent connection or with an extra-flexible five conductor power cable which may be terminated with three-pole, five-wire NEMA connecting plug. When connected at the load end of a three-phase, six-wire branch circuit, the filter can be supplied with a pre-wired flexible conduit for permanent connection. Finally, when connected at the load end of a two-phase, three-wire "shared neutral" branch circuit, a three-phase, four-wire "shared neutral" branch circuit or a three-phase, six-wire branch circuit, which supplies 'rack mounted' electronic loads, the filter may be configured as a 'rack mounted' version for permanent connection.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An apparatus for reducing the non-linear load-generated zero sequence harmonic currents and voltages on three single-phase circuits, which are combined to form a six-wire branch circuit, and their three-phase, four-wire distribution system source, said apparatus comprising:

a three-phase zig-zag autotransformer, having three pairs of phase and neutral terminals; and means for respectively connecting the phase and neutral terminals of the zig-zag autotransformer in parallel with the six-wire branch circuit at the load-end thereof.

2. The apparatus as set forth in claim 1, wherein said autotransformer comprises six windings having an equal number of turns respectively installed in pairs on three core legs of a three-phase core, the paired terminal ends of said windings defining the three pairs of phase and neutral terminals, respectively.

3. The apparatus as set forth in claim 2, wherein said means for respectively connecting the phase and neutral terminals of the zig-zag autotransformer in parallel with the six-wire branch circuit at the load-end thereof comprises connecting the phase and neutral terminals within a junction box.

4. The apparatus as set forth in claim 2, wherein said means for respectively connecting the phase and neutral terminals of the zig-zag autotransformer in parallel with the six-wire branch circuit at the load-end thereof comprises connecting the phase and neutral terminals within a partition wireway.

5. The apparatus as set forth in claim 2, wherein said means for respectively connecting the phase and neutral terminals of the zig-zag autotransformer in parallel with the six-wire branch circuit at the load-end thereof comprises connecting the phase and neutral terminals via a connecting plug.

6. An apparatus for reducing the non-linear load-generated zero sequence harmonic currents and voltages on three single-phase circuits, which are combined to form a four-wire, "shared neutral" branch circuit, and their three-phase, four-wire distribution system source, said apparatus comprising:

a three-phase zig-zag autotransformer, having three pairs of phase and neutral terminals;

means for connecting the three neutral terminals to the shared neutral of the branch circuit; and means for respectively connecting the phase terminals of the zig-zag autotransformer in parallel with the three phases of the branch circuit at the load-end thereof.

7. The apparatus as set forth in claim 6, wherein said autotransformer comprises six windings having an equal number of turns respectively installed in pairs on three core legs of a three-phase core, the paired terminal ends of said windings defining the three pairs of phase and neutral terminals, respectively.

8. The apparatus as set forth in claim 7, wherein said means for respectively connecting the phase terminals of the zig-zag autotransformer in parallel with the three phases of the branch circuit at the load-end thereof comprises connecting the phase terminals within a junction box.

9. The apparatus as set forth in claim 7, wherein said means for respectively connecting the phase terminals of the zig-zag autotransformer in parallel with the three phases of the branch circuit at the load-end thereof comprises connecting the phase terminals within a partition wireway.

10. The apparatus as set forth in claim 7, wherein said means for respectively connecting the phase terminals of the zig-zag autotransformer in parallel with the three phases of the branch circuit at the load-end thereof comprises connecting the phase terminals via a connecting plug.

11. A method for reducing the non-linear load-generated zero sequence harmonic currents and voltages on three single-phase circuits, which are combined to form a six-wire branch circuit, and their three-phase, four-wire distribution system source, said method comprising respectively connecting three pairs of phase and neutral terminals of a three-phase zig-zag autotransformer in parallel with the six-wire branch circuit at the load-end thereof.

12. The method as set forth in claim 11, wherein said autotransformer comprises six windings having an equal number of turns respectively installed in pairs on three core legs of a three-phase core, the paired terminal ends of said windings defining the three pairs of phase and neutral terminals, respectively.

13. The method as set forth in claim 12, wherein the step of respectively connecting the phase and neutral terminals of the zig-zag autotransformer in parallel with the six-wire branch circuit at the load-end thereof comprises connecting the phase and neutral terminals within a junction box.

14. The method as set forth in claim 12, wherein the step of respectively connecting the phase and neutral terminals of the zig-zag autotransformer in parallel with the six-wire branch circuit at the load-end thereof comprises connecting the phase and neutral terminals within a partition wireway.

15. The method as set forth in claim 12, wherein the step of respectively connecting the phase and neutral terminals of the zig-zag autotransformer in parallel with the six-wire branch circuit at the load-end thereof comprises connecting the phase and neutral terminals via a connecting plug.

16. A method for reducing the non-linear load-generated zero sequence harmonic currents and voltages on three single-phase circuits, which are combined to form a four-wire, "shared neutral" branch circuit, and their three-phase, four-wire distribution system source, said method comprising connecting three pairs of phase and neutral terminals of a three-phase zig-zag autotransformer to the shared neutral of the branch circuit and respectively connecting the phase terminals of the zig-zag autotransformer in parallel with the three phases of the branch circuit at the load-end thereof.

17. The method as set forth in claim 16, wherein said autotransformer comprises six windings having an equal number of turns respectively installed in pairs on three core legs of a three-phase core, the paired terminal ends of said windings defining the three pairs of phase and neutral terminals, respectively.

18. The method as set forth in claim 17, the step of respectively connecting the phase terminals of the zig-zag autotransformer in parallel with the three phases of the branch circuit at the load-end thereof comprises connecting the phase terminals within a junction box.

19. The method as set forth in claim 17, wherein the step of respectively connecting the phase terminals of the zig-zag autotransformer in parallel with the three phases of the branch circuit at the load-end thereof comprises connecting the phase terminals within a partition wireway.

20. The method as set forth in claim 17, wherein the step of respectively connecting the phase terminals of the zig-zag autotransformer in parallel with the three phases of the branch circuit at the load-end thereof comprises connecting the phase terminals via a connecting plug.

* * * * *